United States Patent
Watanabe et al.

(10) Patent No.: US 7,366,524 B2
(45) Date of Patent: Apr. 29, 2008

(54) USING SUBNET RELATIONS FOR PAGING, AUTHENTICATION, ASSOCIATION AND TO ACTIVATE NETWORK INTERFACES IN HETEROGENEOUS ACCESS NETWORKS

(75) Inventors: Fujio Watanabe, San Jose, CA (US); Jingjun Cao, Mountain View, CA (US); Shoji Kurakake, San Francisco, CA (US)

(73) Assignee: NTT DoCoMo Inc., Tokyo (JP)

( * ) Notice: Subject to any disclaimer, the term of this patent is extended or adjusted under 35 U.S.C. 154(b) by 753 days.

(21) Appl. No.: 10/119,558

(22) Filed: Apr. 10, 2002

(65) Prior Publication Data

US 2003/0148777 A1    Aug. 7, 2003

Related U.S. Application Data

(60) Provisional application No. 60/354,568, filed on Feb. 6, 2002.

(51) Int. Cl.
*H04B 7/20* (2006.01)
*H04Q 7/00* (2006.01)

(52) U.S. Cl. ............... 455/458; 455/433; 370/329; 370/328

(58) Field of Classification Search ............ 455/458, 455/456.1, 456.6, 426.1, 414.2, 515, 445, 455/426, 432.3, 432.1, 456.5, 433, 432; 370/352, 370/328, 349, 401, 235, 466, 312, 329; 709/225, 709/238, 217, 230, 219
See application file for complete search history.

(56) References Cited

U.S. PATENT DOCUMENTS 5,369,681 A * 11/1994 Boudreau et al. ......... 455/456.1
5,706,331 A * 1/1998 Wang et al. ............. 455/426.1
6,058,308 A * 5/2000 Kallin et al. ............. 455/432.3
6,085,086 A * 7/2000 La Porta et al. ......... 455/432.3

(Continued)

FOREIGN PATENT DOCUMENTS

EP    0 996 304 A1    4/2000

(Continued)

OTHER PUBLICATIONS

Becchetti, L., Priscoll, F.D., Inzerilli, T., Mahonen, P., Munoz, L., "Enhancing IP service provision over heterogeneous wirless networks: A path toward 4G," IEEE Communications Magazine, vol. 39, No. 8, pp. 74-81, Aug. 2001.

(Continued)

*Primary Examiner*—Joseph Feild
*Assistant Examiner*—Kiet Doan
(74) *Attorney, Agent, or Firm*—Edward C. Kwok; MacPherson Kwok Chen & Heid LLP

(57) ABSTRACT

A system and method for using subnet relations to determine paging areas, for performing authentication and association, and to activate access network interfaces in wireless communication devices in a heterogeneous access network. Paging areas are generated using subnet relations by determining mobility agent servers within a predetermined number of subnet relations from a last active mobility agent server. Authentication and association are also accomplished using subnet relations. Access network interfaces can also be turned on and off based on subnet relations thereby conserving battery power.

24 Claims, 17 Drawing Sheets

U.S. PATENT DOCUMENTS

| | | | | |
|---|---|---|---|---|
| 6,097,955 | A * | 8/2000 | Bhat | 455/445 |
| 6,137,791 | A * | 10/2000 | Frid et al. | 370/352 |
| 6,363,255 | B1 * | 3/2002 | Kuwahara | 455/456.5 |
| 6,407,988 | B1 * | 6/2002 | Agraharam et al. | 370/328 |
| 6,487,406 | B1 * | 11/2002 | Chang et al. | 455/422.1 |
| 6,665,291 | B1 * | 12/2003 | Shahdad et al. | 370/352 |
| 6,691,164 | B1 * | 2/2004 | Hundscheidt et al. | 709/225 |
| 6,745,039 | B1 * | 6/2004 | Di Lalla | 455/458 |
| 6,763,004 | B1 * | 7/2004 | De Oliveira | 370/312 |
| 6,795,709 | B2 * | 9/2004 | Agrawal et al. | 455/452.1 |
| 6,842,462 | B1 * | 1/2005 | Ramjee et al. | 370/466 |
| 6,845,094 | B1 * | 1/2005 | Zhang | 370/349 |
| 7,120,453 | B2 * | 10/2006 | La Porta et al. | 455/458 |
| 2001/0036834 | A1 * | 11/2001 | Das et al. | 455/458 |
| 2002/0007414 | A1 * | 1/2002 | Inoue et al. | 709/230 |
| 2002/0046287 | A1 * | 4/2002 | La Porta et al. | 709/230 |
| 2002/0099799 | A1 * | 7/2002 | Kolsky | 709/219 |
| 2002/0107025 | A1 * | 8/2002 | Oliveira | 455/452 |
| 2002/0136226 | A1 * | 9/2002 | Christoffel et al. | 370/401 |
| 2002/0151307 | A1 * | 10/2002 | Demarez et al. | 455/445 |
| 2003/0028612 | A1 * | 2/2003 | Lin et al. | 709/217 |
| 2003/0048762 | A1 * | 3/2003 | Wu et al. | 370/328 |
| 2003/0073449 | A1 * | 4/2003 | Motegi et al. | 455/458 |
| 2003/0076814 | A1 * | 4/2003 | Gurivireddy et al. | 370/352 |
| 2003/0095504 | A1 * | 5/2003 | Ogier | 370/235 |
| 2004/0024901 | A1 * | 2/2004 | Agrawal et al. | 709/238 |
| 2004/0176023 | A1 * | 9/2004 | Linder et al. | 455/3.01 |

FOREIGN PATENT DOCUMENTS

| | | |
|---|---|---|
| EP | 1 089 578 A2 | 4/2001 |
| EP | 1 335 528 A2 | 8/2003 |
| WO | WO 97/32445 | 9/1997 |
| WO | WO 01/31963 A1 | 5/2001 |
| WO | WO 01/38983 A2 | 5/2001 |
| WO | WO 01/65885 | 9/2001 |
| WO | WO 01/65885 A1 | 9/2001 |
| WO | WO 01/72076 A1 | 9/2001 |

OTHER PUBLICATIONS

Woesner, H., Ebert, J.P., Schlager, M., Wolisz, A., "Power-Saving Mechanisms in Emerging Standards for Wireless LANs: The MAC Level Perspective," IEEE Personal Communications, vol. 5, No. 3, pp. 40-48, Jun. 1998.

Zorzi, M., Rao, R.R., "Error Control and Energy Consumption in Communications for Nomadic Computing," IEEE Transactions on Computers, vol. 46, No. 3, pp. 279-289, Mar. 1997.

Funato, D., He, X., Williams, C., Takeshita, A., "Geographically Adjacent Access Router Discovery Protocol," Internet Draft,16 pages, Dated Nov. 2001, Expires May 14, 2002.

T. Saito, W. Leland, "LIS (Logical IP Subnet) over ATM," 1996 IEEE International Conference On Communications (ICC). Converging Technologies For Tomorrow's Applications. Dallas, Jun. 23-27, 1996, IEEE International Conference On Communications (ICC.), New York, IEEE, US, vol. 1, Jun. 23, 1996, pp. 398-404, XP000625704.

P. Mahonen, T. Saarinen, N. Passas, G. Orphanos, L. Munoz, M. Garcia, A. Marshall, D. Melpignano, T. Inzerilli, F. Lucas, M. Vitiello, "Platform-Independent IP Transmission Over Wireless Networks: The Wine Approach," IEEE Personal Communications, IEEE Communications Society, US, vol. 8, No. 66, Dec. 2001, pp. 32-40, XP001076793.

* cited by examiner

| CURRENTLY USER ATTACHES TO MAS | IT IS POSSIBLE FOR USER TO HANDOFF TO THE FOLLOWING MAS |
|---|---|
| MAS_1 | MAS_3 |
| MAS_2 | MAS_3, MAS_4 |
| MAS_3 | MAS_1, MAS_2, MAS_4, MAS_A, MAS_B |
| MAS_4 | MAS_2, MAS_3, MAS_C |
| MAS_A | MAS_3 |
| MAS_B | MAS_3 |
| MAS_C | MAS_4 |

Fig. 7

USING SUBNET RELATIONS FOR PAGING, AUTHENTICATION, ASSOCIATION AND TO ACTIVATE NETWORK INTERFACES IN HETEROGENEOUS ACCESS NETWORKS

This application claims the benefit under 35 U.S.C. §119 (e) of Provisional U.S. Patent Application Ser. No. 60/354,568, filed on Feb. 6, 2002.

FIELD OF THE INVENTION

The present invention relates generally to wireless communication systems and, more particularly, to a preferred system and method for using subnet relations to determine paging areas, for performing authentication and association, and to activate access network interfaces in wireless communication devices in a heterogeneous access network.

BACKGROUND OF THE PRESENT INVENTION

Limiting the energy consumption of computers, especially portables, is becoming increasingly important. New energy-saving computer components and architectures have been and continue to be developed in different aspects such as circuit design, battery technology, semiconductor technology, and communication systems. The problem is to minimize energy consumption while not significantly impacting the effective performance of the wireless device.

Fourth-generation systems will likely not use a single standardized air interface, but a set of different technologies and standards. Additionally, the fixed network system will also be a part of future heterogeneous network systems. Therefore, an intensive effort to reduce power consumption is required.

Handheld portable devices are composed of a combination of digital, mixed signal, and even radio frequency circuits that together perform all of the functionality required to communicate across the heterogeneous wireless environment. The need to communicate with people using different types of equipment can only be solved with software reprogrammable radios. A software programmable radio can communicate with many different radios with only a change in software parameters.

A typical handheld portable device has an acceptable weight range between 4-12 oz. for most handheld applications based on human factor studies. The well-known nickel cadmium (NiCd) batteries, lithium-ion (Li-ion) batteries, and nickel metal hydride (NiMH) batteries are popular; however, multiple access systems need more powerful batteries and other technologies to reduce battery drain. Unfortunately, significant improvements in battery technology are not expected in the next few years because battery technology typically only doubles in performance in energy density roughly every 35 years.

One way to reduce energy consumption is to use and develop components that consume less power. Another way is to use components that can enter low power modes by temporarily reducing their speed or functionality. For this scheme, one strategy is to compress TCP/IP headers, which reduces their size by an order of magnitude, thereby reducing the wireless communication activity of a mobile client. Another way is to reduce the data transmission rate or stop data transmission altogether when the channel is bad, i.e., when the probability of dropped packets is high, so that less transmission time is wasted sending packets that will be dropped.

Another method is to use a medium access control protocol that dictates in advance when each wireless device may receive data. In addition, another strategy is to have servers or proxies use information about mobile client characteristics and data semantics to provide mobile clients with versions of data with reduced fidelity and smaller size, which reduces the amount of energy mobile clients must expend to receive the data. For example, a data server might convert a color picture to a black-and-white version before sending it to a mobile client. Of course, it is necessary to design applications that avoid unnecessary communication, especially in the expensive transmit direction.

Another need exists for systems that are capable of determining paging areas in heterogeneous access networks. Other areas of interest in heterogeneous access networks include authentication, association and methods for activating access network interfaces in heterogeneous access networks.

SUMMARY OF THE INVENTION

A preferred embodiment of the present invention discloses a system and method for determining a paging area for a wireless communication device. In the preferred embodiment, a last mobility agent server that serviced the wireless communication device is determined using a virtual operator server. The virtual operator server organizes and bands together various access network operators, service providers, content providers and users. To organize the various access network operators, service providers and content providers, the user is provided with the ability to establish one community. Within this community, the user is capable of getting a seamless access through different access networks. After the virtual operator server determines the last mobility agent server, a list of mobility agent servers within a predetermined number of subnet relations from the last mobility agent server is retrieved to determine the paging area. A paging message is then generated that is sent to the list of mobility agent servers.

A subnet relation map is used to determine the list of mobility agent servers within the predetermined number of subnet relations from the last mobility agent server. A subnet relation algorithm determines the predetermined number of subnet relations that are retrieved. An application characteristic database and a personal device characteristic database are used to help determine the paging area. If the paging area that is determined fails, then the preferred embodiment of the present invention creates an increased paging area that is used to locate the wireless communication device. The increased paging area is determined by adding a predetermined number of subnet relations to the original paging area.

Another preferred embodiment of the present invention discloses a system and method for determining access network interface activation for a wireless communication device that is connected to a heterogeneous access network. In this embodiment, a plurality of mobility agent servers are provided that are connected to a virtual operator server. A current active mobility agent server is determined for the wireless communication device. A list of mobility agent servers is then retrieved that is within a predetermined number of subnet relations from the current active mobility agent server. A type of access network interface used for each mobility agent server contained in the list of mobility agent servers is then determined by the virtual operator server. The wireless communication device is then notified of the types of access network interfaces by the virtual operator server.

The wireless communication device can download the subnet relation map from the current associated access network, so that the wireless communication device (user) can choose the appropriate access network based on the user's decision or user's policy. For example, the wireless communication device is currently accessing a WLAN, then the wireless communication device can download the subnet relation map through WLAN from the virtual operator server.

Yet another preferred embodiment of the present invention discloses a system and method for providing pre-authentication for a wireless communication device in a heterogeneous access network. In this embodiment, a current active mobility agent server that is associated with the wireless communication device is determined by the virtual operator server. Next, a list of mobility agent servers within a predetermined number of subnet relations, which the wireless communication device can access, is retrieved from a subnet relation map located on the virtual operator server. All possible mobility agent servers will be determined by the virtual operator server based on the subnet relation map. A pre-authentication message is generated that is transmitted to each mobility agent server contained in the list of mobility agent servers.

Further objects and advantages of the present invention will be apparent from the following description, reference being made to the accompanying drawings wherein preferred embodiments of the invention are clearly illustrated.

BRIEF DESCRIPTION OF THE DRAWINGS

FIG. 7 is a table illustrating subnet relationships between respective mobility agent servers based on the subnet relation map illustrated in FIG. 6.

DETAILED DESCRIPTION OF THE PRESENTLY PREFERRED EMBODIMENTS OF THE INVENTION

Figure 1:
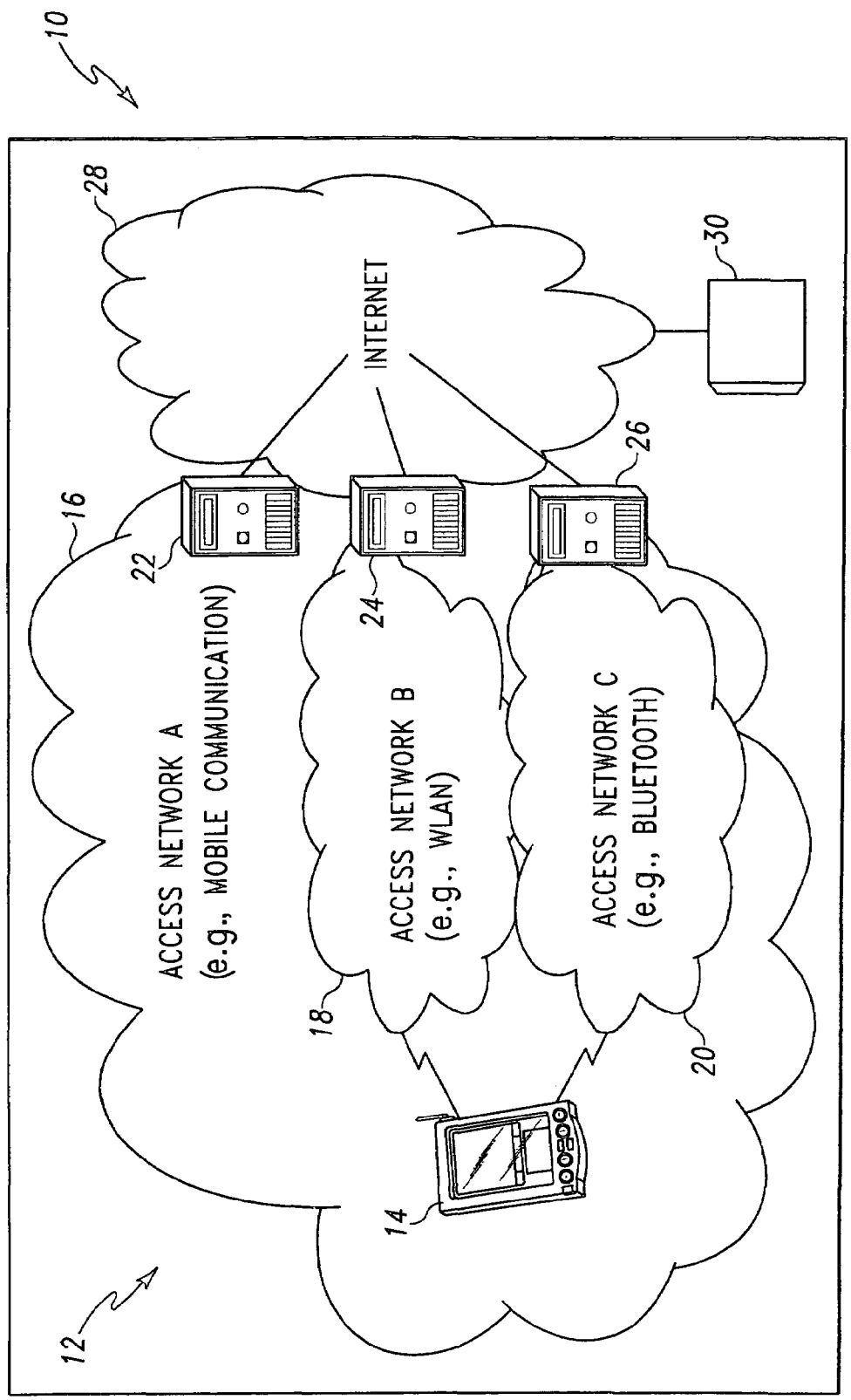
FIG. 1 illustrates a wireless communication system that includes a plurality of subnets.

Referring to FIG. 1, a preferred embodiment of the present invention includes a wireless communication network 10 that has an IP subnet 12. As set forth in greater detail below, a mobility agent server (MAS) creates the IP subnet 12. The terms "subnet" and "mobility agent" are terms understood by those skilled in the art as having meanings in mobile computer networks, such as those conforming to the Mobile Internet Protocol (e.g., IPv4 or IPv6 protocol). For example, the Internet Engineering Task Force Request for Comments (IETF RFC) 2002 explains that a mobility agent is "either a home agent or a foreign agent" under a mobile IP protocol. Similarly, the IETF RFC 3753 explains that a "subnet" is "a logical group of connected network nodes." In IP networks, nodes in a subnet share a common network mask (in IPv4) or a network prefix (in IPv6).

In the preferred embodiment, the IP subnet 12 includes at least one wireless communication device 14 that is capable of being connected to a plurality of access networks 16, 18, 20. Each access network 16, 18, 20 preferentially includes a server 22, 24, 26 that is connected to an Internet connection 28. Although not illustrated, those skilled in the art would recognize that the servers 22, 24, 26 are connected to base stations that communicate with the wireless communication devices 14. Each respective server 22, 24, 26 is also connected to a virtual operator server 30 by means of the Internet connection 28. Although not illustrated in FIG. 1, the mobility agent server within each access network 16, 18, 20 is connected to the servers 22, 24, 26 as well.

Figure 2:
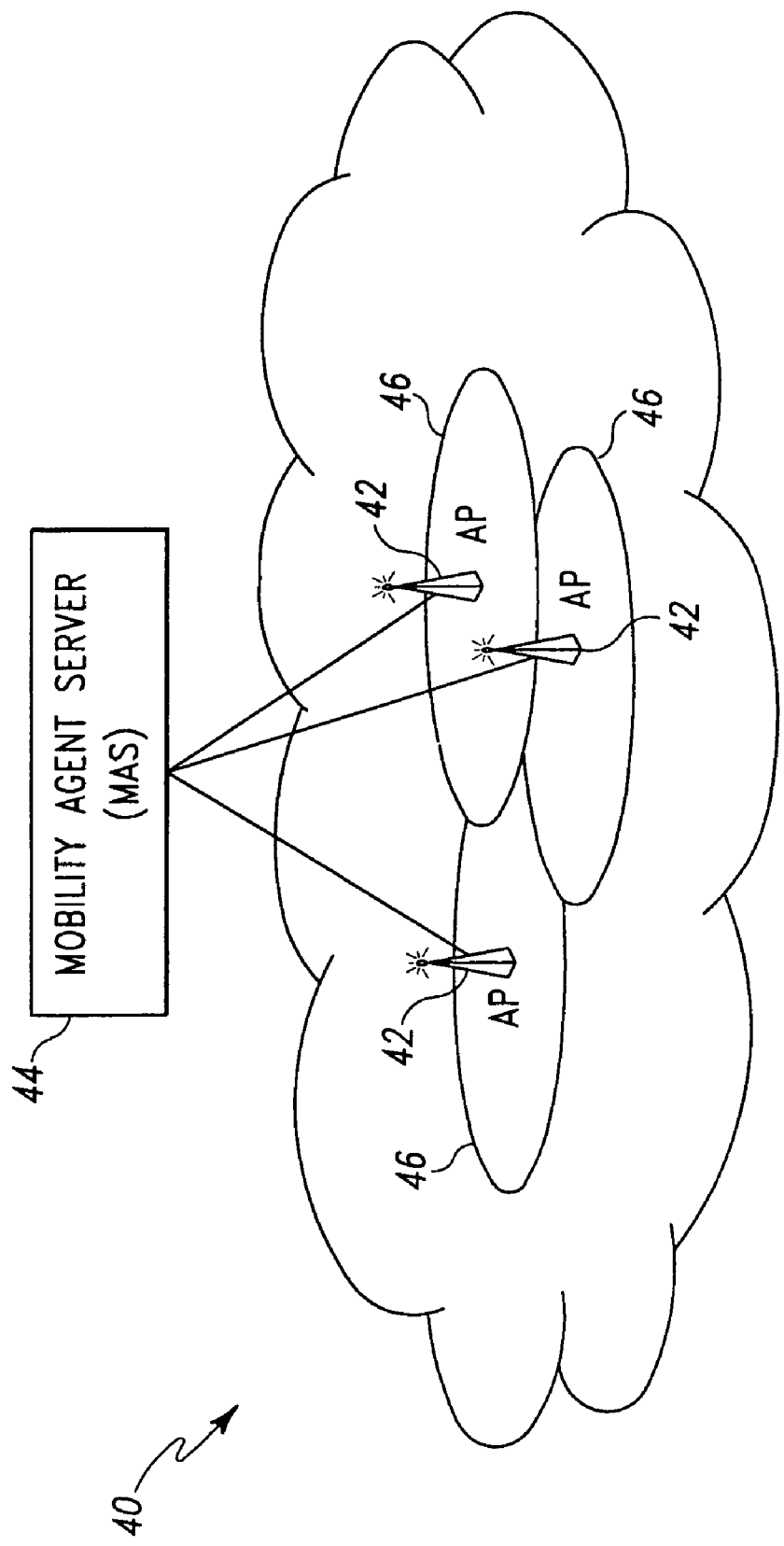
FIG. 2 illustrates a homogeneous wireless access network per the mobile agent.

The present invention is capable of working on both homogeneous and heterogeneous access networks. As illustrated in FIG. 2 as it relates to the present invention, a homogeneous access network 40 would comprise a wireless communication system that includes a plurality of access points 42. Each access point 42 of the access network 40 is connected to the MAS 44. Although not illustrated, each access point 42 is connected to the server by way of the MAS 44. As further illustrated in FIG. 2, each access point 42 has a predefined coverage area that is represented by area 46.

Figure 3:
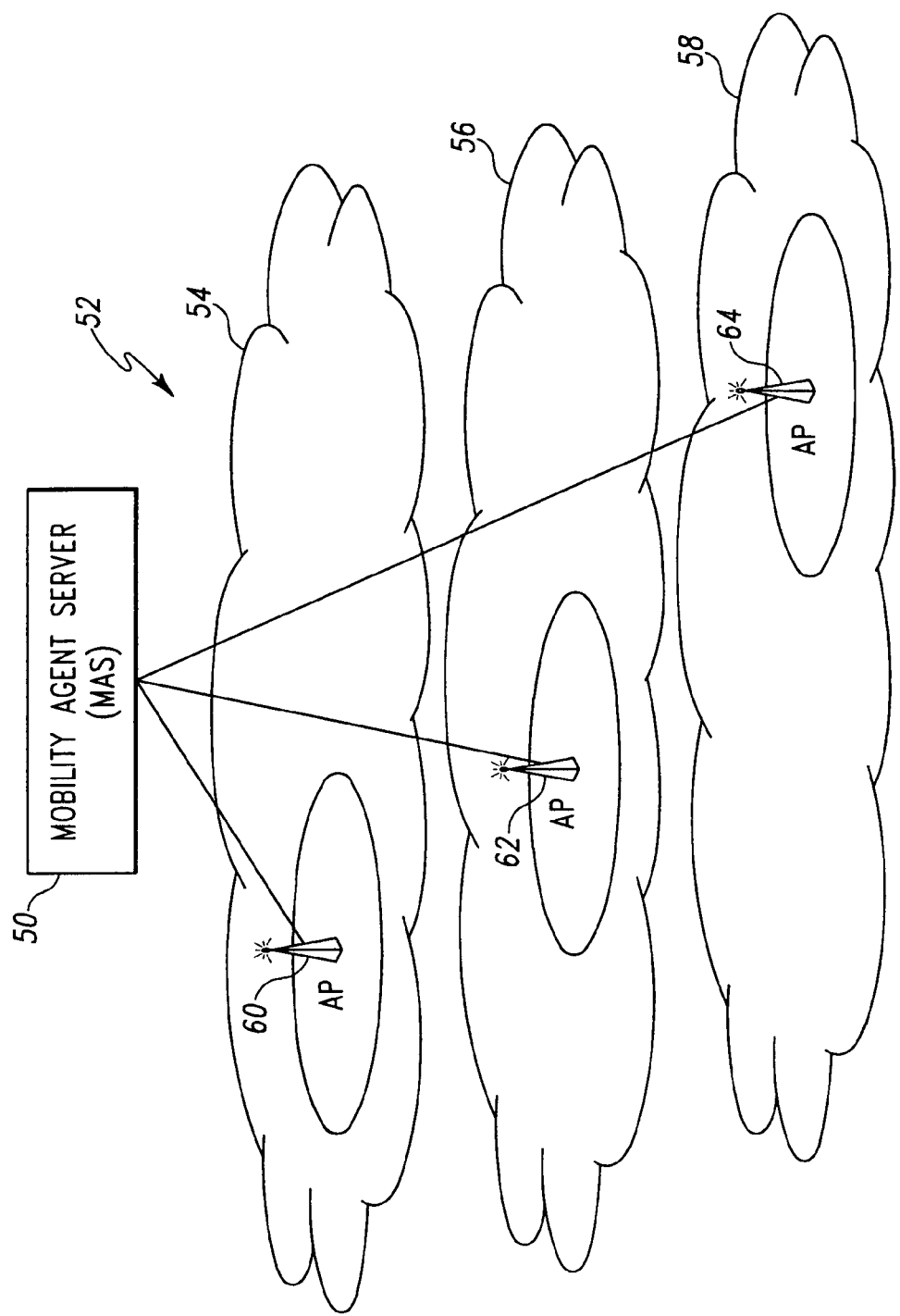
FIG. 3 illustrates a heterogeneous wireless access network per the mobile agent.

Referring to FIG. 3, a second MAS 50 is connected to a heterogeneous access network 52. As clearly illustrated, a heterogeneous access network 52 is made up of a plurality of access networks 54, 56, 58. As illustrated, each respective access network 54, 56, 58 represents a different or diverse type of network from the other and also includes at least one access point 60, 62, 64. In the case of a heterogeneous access network 52, the second MAS 50 is connected to each access point 60, 62, 64, which operate in different access networks 54, 56, 58. Although not specifically illustrated as such in FIG. 3, the access networks 54, 56, 58 can be wireless or wired access networks.

Figure 4:
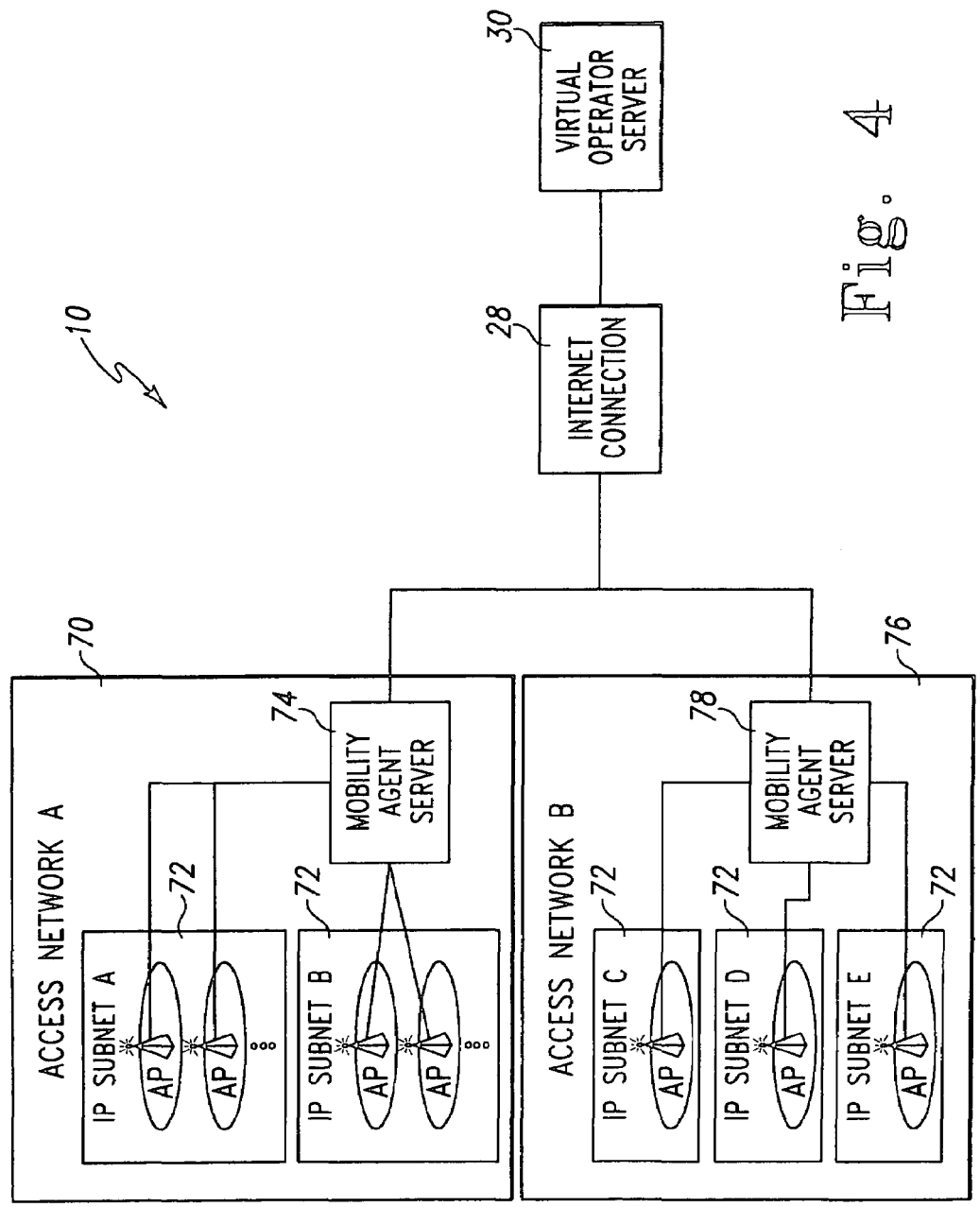
FIG. 4 illustrates a wireless communication system that includes a subnet relation system.

Referring to FIG. 4, which sets forth a general diagram of a preferred wireless IP network 10 used in the present invention, location information is important to manage users in wireless IP networks 10. During operation, the virtual operator server 30 establishes a subnet relation map or database that is based on handoff experience. To complete the subnet relation map, the virtual operator server 30 tracks IP subnet changes when wireless communication devices 14 move from one subnet to another subnet. This movement is generally referred to as a handoff. Subnets are generally assumed to be close to each other when the wireless communication devices 14 can perform a handoff.

As illustrated in FIG. 4, a first access network 70 includes a plurality of IP subnets 72 that are connected to a first MAS 74. Although not specifically illustrated in this figure, it should be noted that there may be more than one MAS in each access network and, as such, the use of one MAS in each access network is for illustrative purposes only and should not be construed as a limitation of the present invention. The second access network 76 also includes a plurality of IP subnets 72 that are connected to a second MAS 78. In this preferred embodiment, each MAS 74, 78 is preferentially connected to an Internet connection 28 that, in turn, connects each MAS 74, 78 with the virtual operator server 30.

Figure 5:
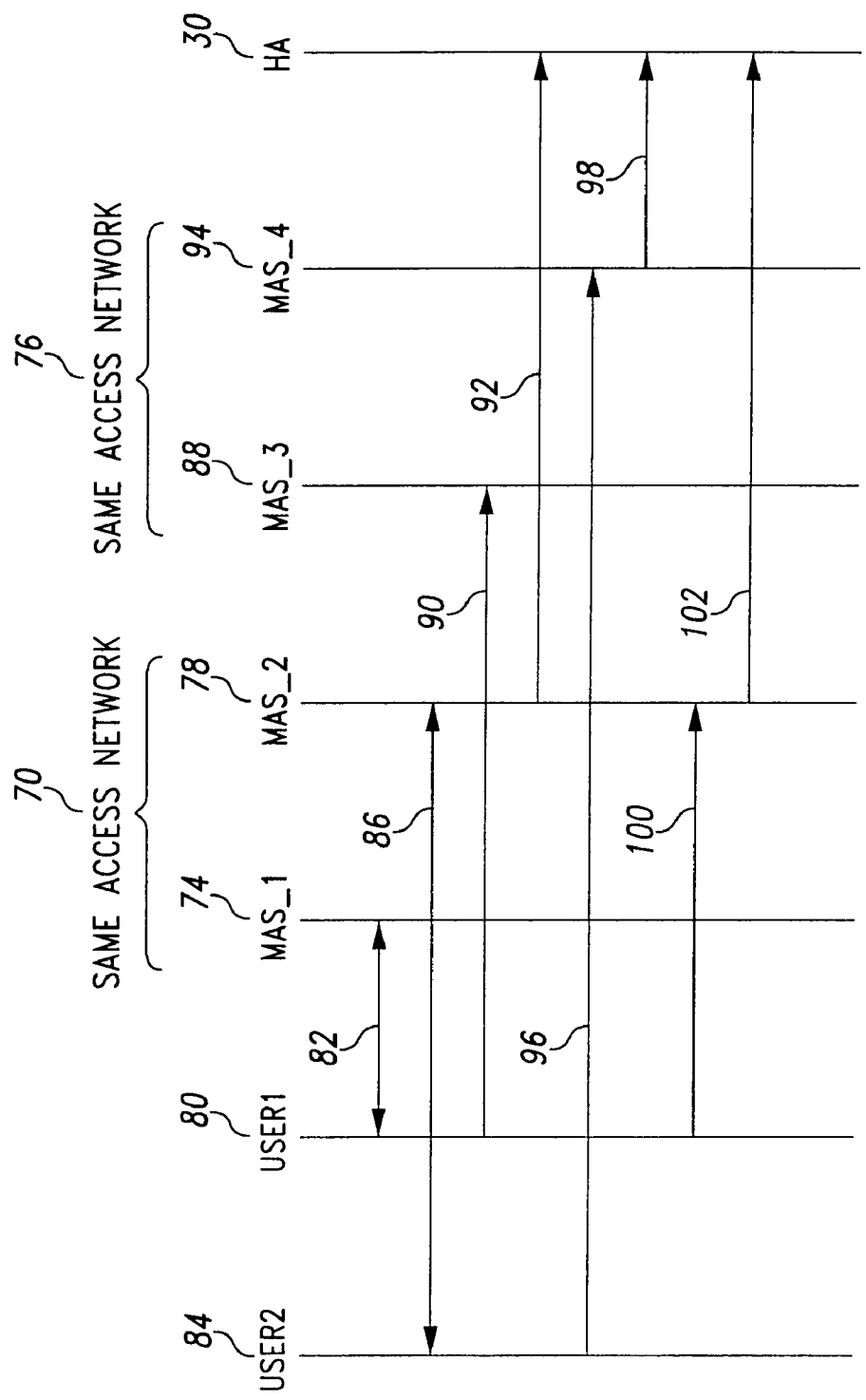
FIG. 5 illustrates user handoffs between access networks that include a mobility agent server.

Referring to FIG. 5, during operation, a first user 80 has a global address assigned by the virtual operator server 30. The first user 80 also has a connection (arrow 82) to the first MAS 74, which is located in the first access network 70. A second user 84 also has a global address assigned by the virtual operator server 30 and connects (arrow 86) to the second MAS 78, which is also located in the first access network 70. When the first user 80 performs a handoff from the first MAS 74 to a third MAS 88, the first user 80 will register its global address to the third MAS 88 (see the arrow 90). The third MAS 88 is located in the second access network 76. At the same time, the third MAS 88 will update the MAS-global address mapping of the first user 80 at the virtual operator server 30 (arrow 92).

When the second user 84 performs a handoff from the second MAS 78 to a fourth MAS 94 (arrow 96), the fourth MAS 94 also updates the MAS-global address mapping at the virtual operator server 30 (arrow 98). If the first user 80 performs another handoff from the third MAS 88 to the second MAS 78 (arrow 100), then the MAS-global address mapping will be updated at the virtual operator server 30 (arrow 102).

In the preferred embodiment of the present invention, the virtual operator server 30 keeps track of a plurality wireless communication devices 14 as they handoff from MAS to MAS. Generally speaking, if one MAS is too far from another MAS, it would be impossible for the user of a wireless communication device 14 to handoff to the distant MAS. Consequently, the ability to handoff usually indicates that each IP subnet is located close to each other so that there is some overlap in coverage areas. As such, the virtual operator server 30 is capable of mapping out the respective interconnections amongst subnets within a full-scale wireless IP network 10. As such, the virtual operator server knows what subnets are located in a respective geographic location that are capable of being accessed by wireless communication devices 14.

Figure 6:
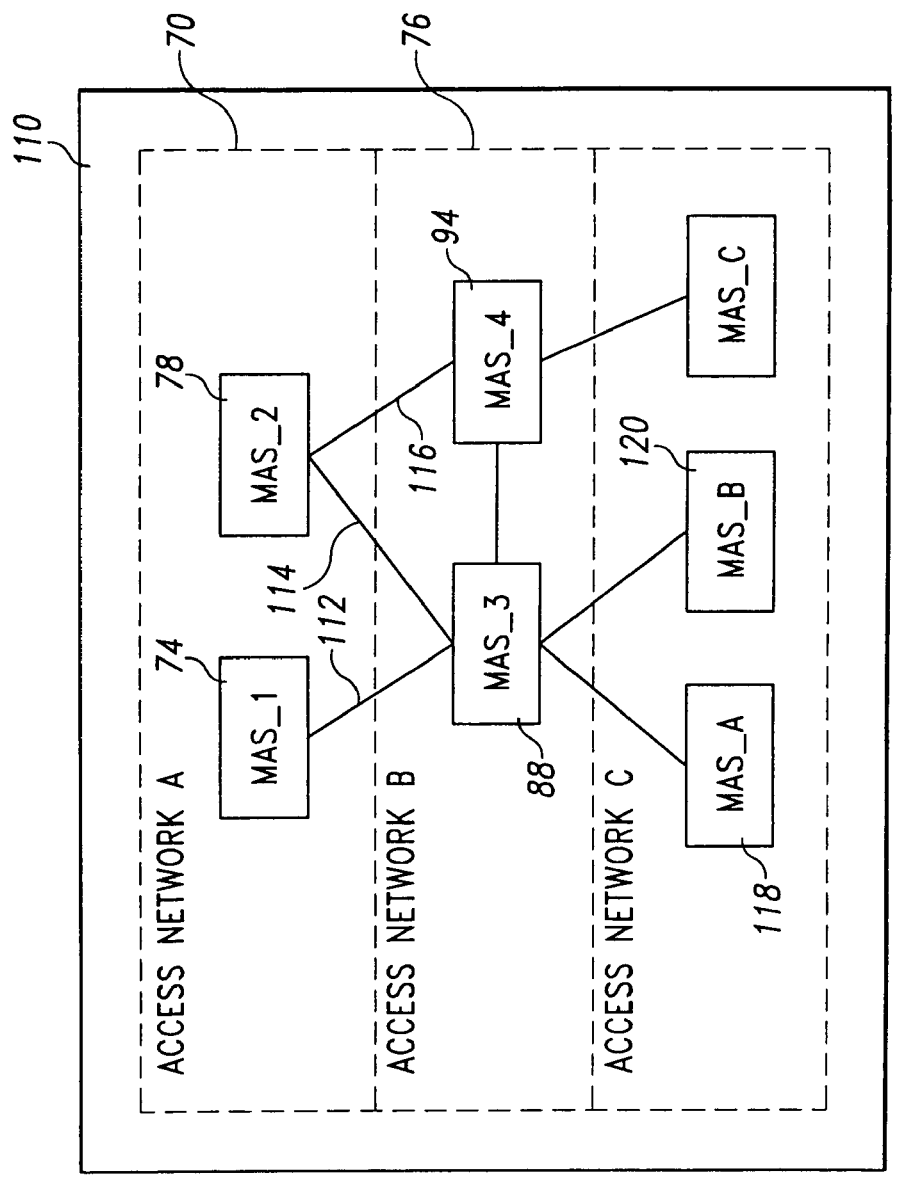
FIG. 6 illustrates an example of a subnet relation map.

Referring to FIG. 6, during operation, the virtual operator server 30 tracks subnet relations by handoff experience and creates a subnet relation map 110. In the example set forth above, the subnet relation map 110 shows that the first MAS 74 has a subnet relation 112 with the third MAS 88, because the first user 80 is capable of handing off from the first MAS 74 to the third MAS 88. Furthermore, the first user 80 is capable of handing off from the third MAS 88 to the second MAS 78, thereby creating another subnet relation 114. Subnet relation 116 is created by the fact that the second user 84 is capable of handing off from the second MAS 78 to the fourth MAS 94.

The subnet relation map 110 illustrated in FIG. 6 represents only a small piece of the total number of access networks that would be connected to the virtual operator server 30. As such, the subnet relation map 110 should be viewed in an illustrative sense and not as a limitation of the present invention. From this subnet relation map 110, it is illustrated that the first MAS 74 has the ability to handoff to the third MAS 88. In turn, the third MAS 88 has the ability to handoff to the first MAS 74, the second MAS 78, the fourth MAS 94, a fifth MAS_A 118 and a sixth MAS_B 120. FIG. 7 illustrates all of the subnet relations that are possible for each MAS in the example set forth in FIG. 6.

As it relates to the preferred embodiment of the present invention, knowing this information gives the virtual operator server 30 the ability to assist the wireless communication device 14 in its efforts to reduce power consumption. In one preferred embodiment, the wireless communication device 14 could shut down the network interface that is associated with a particular type of subnet or set the network interface into a sleep mode. Either of these options allows the wireless communication device 14 to conserve energy by reducing or eliminating power consumption that is associated with network interfaces.

Figure 8:
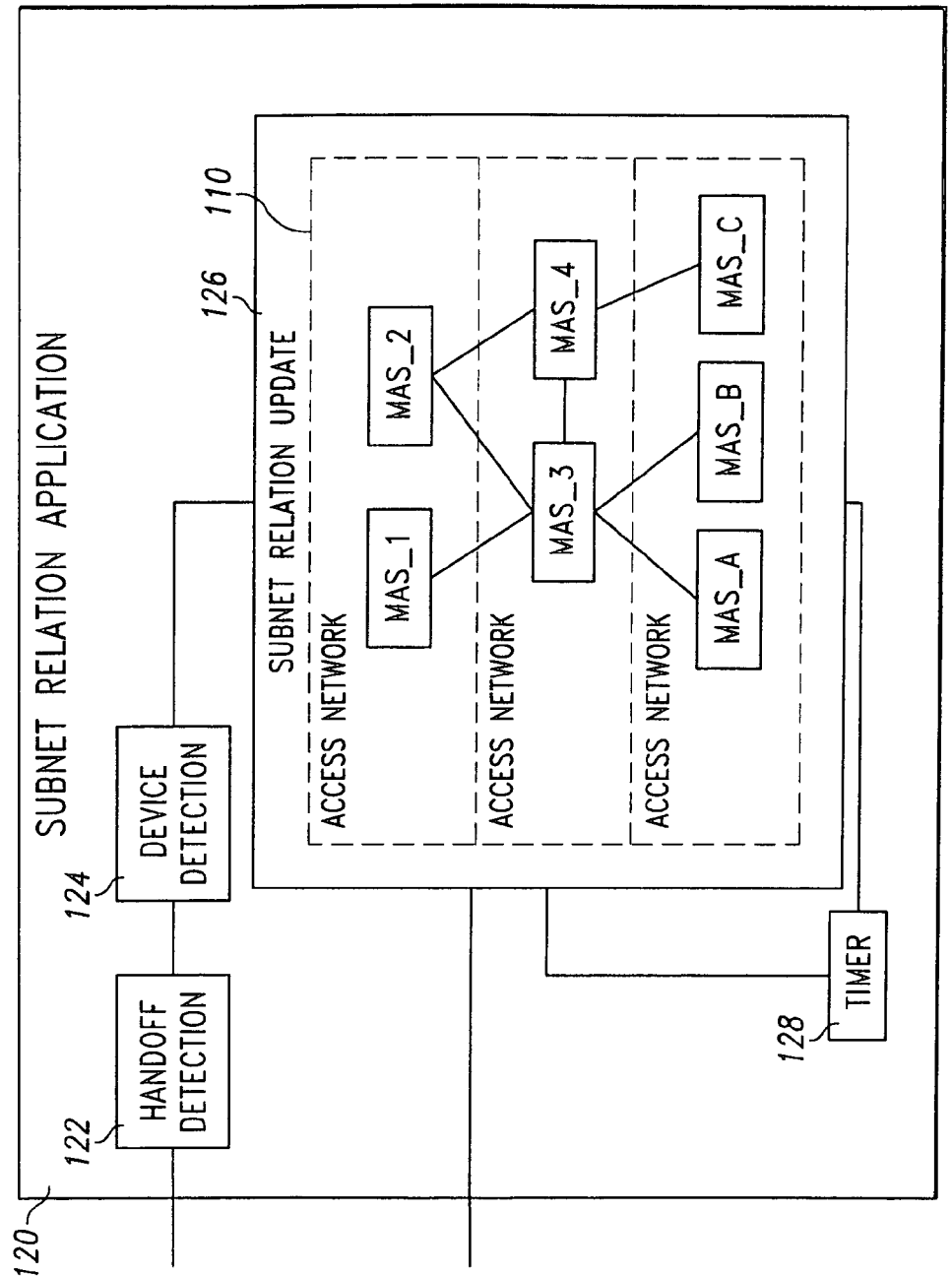
FIG. 8 illustrates the preferred subnet relation map application.

FIG. 8 illustrates a preferred subnet relationship application 120 that creates the subnet relation map 110, which is located on the virtual operator server 30. At first, a handoff is detected by a handoff detection application 122. The handoff detection application 122 preferentially identifies subnet handoffs, which means that the IP address assigned by the MAS has changed because the wireless communication device 14 has moved from a current MAS territory to another MAS territory. In addition, this detection includes that this IP address change is triggered by the handoff.

If a handoff is detected, the preferred embodiment of the present invention also determines whether or not the wireless communication device 14 initiated the handoff or some other source initiated the handoff, which is illustrated at the device detection step 124. Since the same wireless communication device 14 may use a different IP address at different access networks, it is necessary to know whether the wireless communication device 14 initiated the handoff in order to create a more accurate subnet relation map 110; especially when the wireless communication device 14 has two or more access network interfaces, as each access network interface may have a different IP address.

After determining whether or not the user initiated the handoff, a subnet relation update application 126 is used to update the subnet relation map 110 based on the handoff. The subnet relation indicates a physical location because the handoff will occur only at the overlapping areas which are operated by different subnets. Therefore, the virtual operator server 30 creates and maintains the subnet relation map 110 based only on subnet changing information (subnet handoff information). After the virtual operator server 30 has some handoff experience, the subnet relation map 110 becomes relatively stable. However, it is necessary to update the subnet relation map 110 because some subnets can be instantaneously attached to an access network and also removed from the access network.

For instance, a wireless LAN access network 18 may be attached to the wireless network 12 and removed from the wireless network 12. This movable case will happen especially in private networks. Therefore, in order to keep the accuracy of the subnet relation map 110, a timer 128 may be used to ensure that the subnet relation map 110 is accurate. For instance, if the handoff occurred one day ago, the subnet relation is likely still accurate even under a private network.

However, if the handoff has not occurred for one year, the subnet relation may not be as clear, especially in the case of a private network.

As set forth in greater detail below, once the subnet relation map 110 has been created and is filled with various subnet relations between respective MAS sites, the subnet relation information can be used for paging, to activate an access network, for the selection of an access network for authentication, and the selection of access networks for association.

Figure 9:
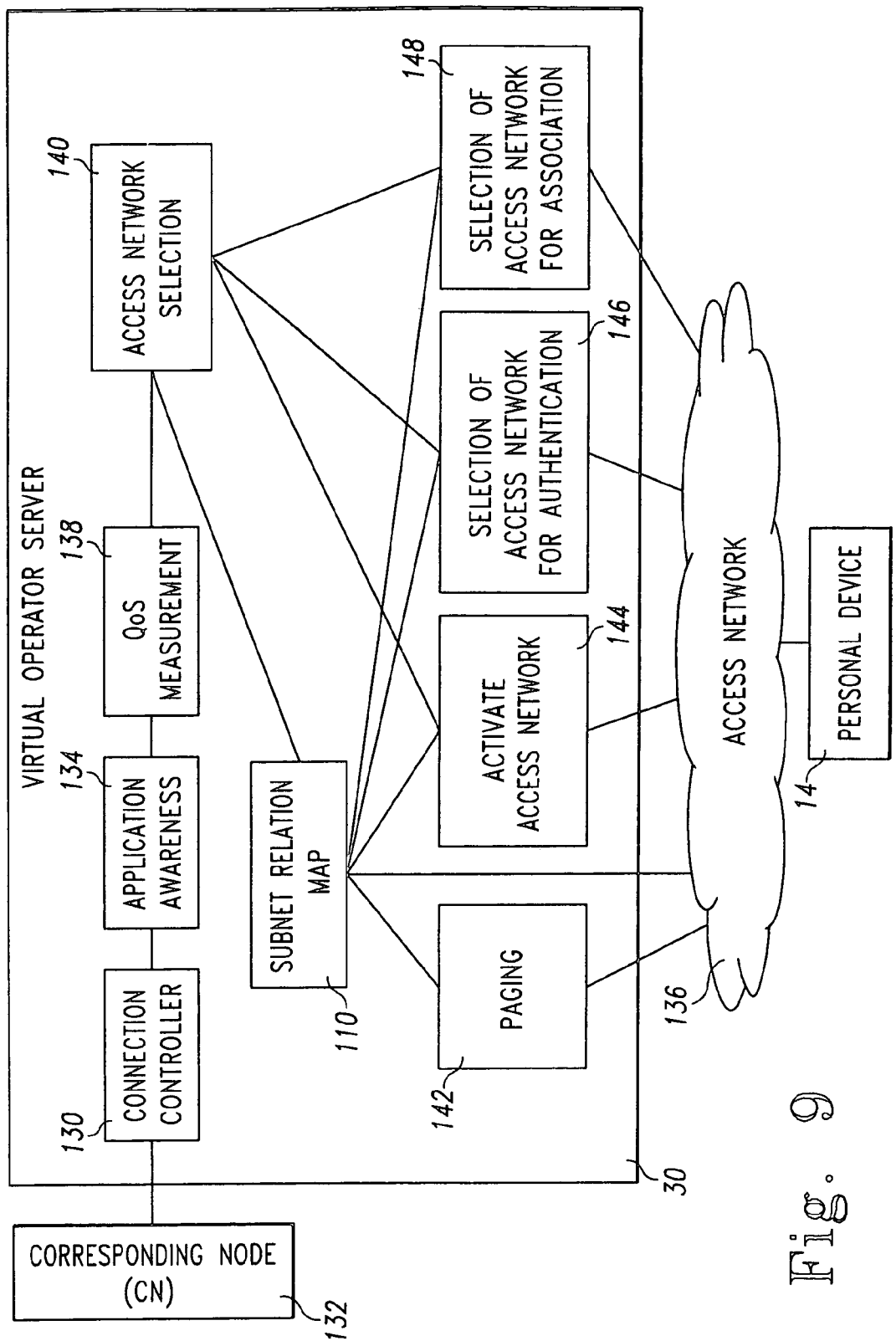
FIG. 9 illustrates preferred applications of the virtual operator server.

FIG. 9 illustrates other software applications of the preferred virtual operator server 30. During operation, a connection controller 130 exchanges data between the virtual operator server 30 and a corresponding node (CN) 132. An application awareness application 134 is used to detect the type of application that is being used by the wireless communication device 14. The application awareness application 134 is used to help choose an access network 136 that is suitable for the application being used by the wireless communication device 14. A quality of service (QoS) measurement application 138 estimates the access network 136 capability for each particular application. The access network 136 will not necessarily be specified, so the present invention may apply to both wireless and wired access networks.

Figure 10:
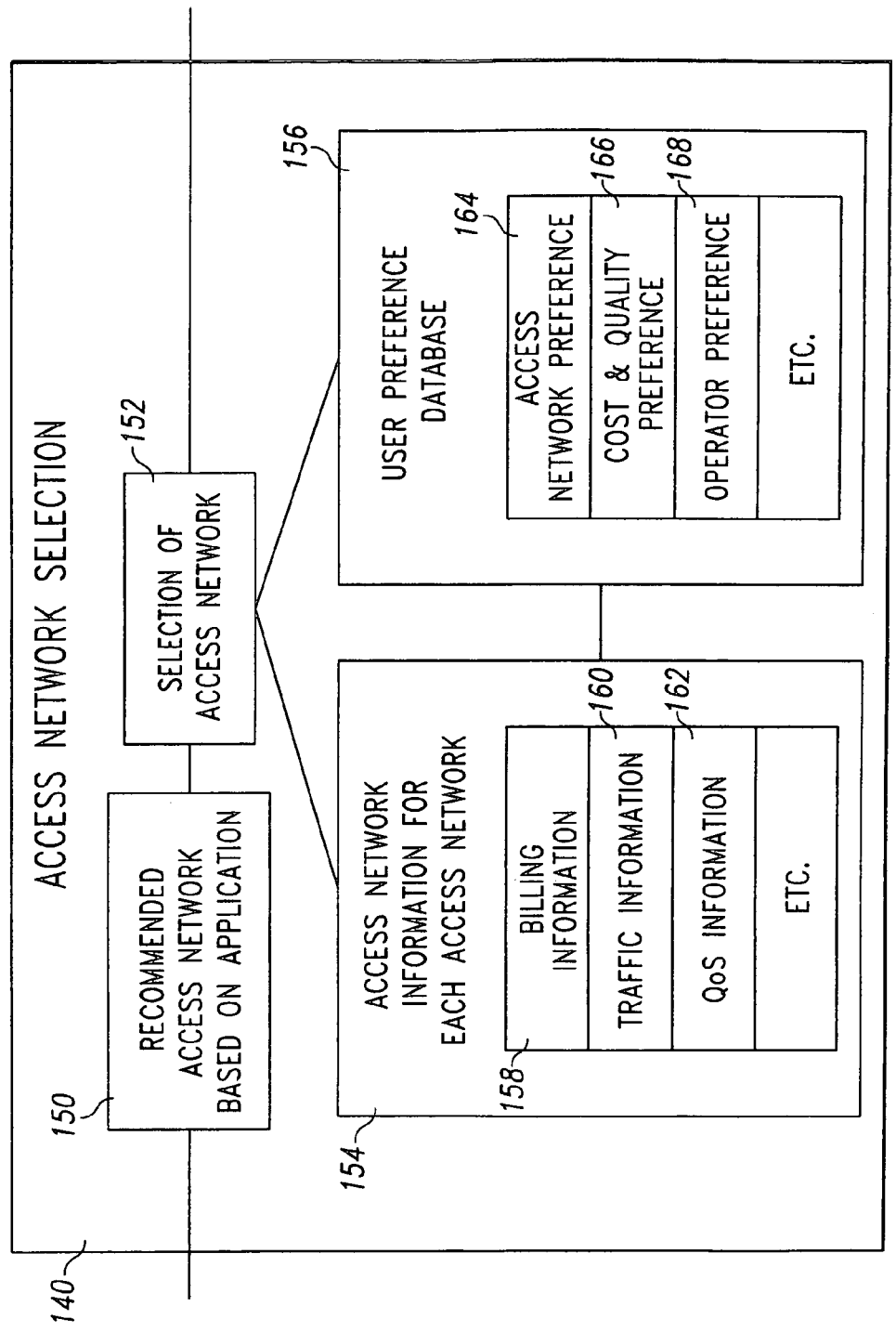
FIG. 10 illustrates the preferred access network selection component.

An access network selection application 140 is also located on the virtual operator server 30. The access network selection application 140 chooses a suitable access network or possible access network. It may choose two or more different access networks depending on the number of connections and type of applications. FIG. 10 shows details of the preferred access network selection application 140. The access network selection application 140 includes a recommended access network application 150 that is used to choose access networks which are suitable for the current application. If the current application cannot be detected, the recommended access network application 150 will not recommend or choose any access network. A selection of access network database 152 selects access networks that are used to connect the corresponding node 132 and the wireless communication device 14. In order to make a proper choice of access networks, the selection of access network database 152 gets information from an access network information module 154 and a user preference database 156.

The access network information database 152 contains information concerning each access network condition, such as billing information 158 which describes how charges may apply to applications, traffic information 160 which indicates the current traffic condition being experienced by the access network, and QoS (quality of service) information 162 which describes how respective access networks can meet QoS requirements (delay, latency etc). Other information about each access network may also be made available through the access network information database 154.

The user preference database 156 stores user preference information such as an access network preference 164, which indicates the user's preferred access network and primary access network a cost and quality preference 166, which indicates the user's affordable payment and requirement of QoS, and an operator preference 168, which indicates the user's preference operator under multiple operators. Other user preferences may also be stored in the user preference database 156.

Referring back to FIG. 9, a paging application 142 is also included on the virtual operator server 30 that will in essence wake up the wireless communication device 14 when it is operating in a dormant mode. When operating in the dormant mode, the wireless communication device 14 listens to broadcasting paging messages.

An activate access network application 144 is used to generate an activate message that is sent to the wireless communication device 14 when some access network interfaces are in the power saving mode or not activated at all. Once the activate message is received by wireless communication device 14, it will turn on the desired access network interface. For instance, it is not efficient to turn on a wireless LAN interface if there is no wireless LAN to interfere with during operation. Therefore, the wireless LAN interface will be turned off to save the power drain. However, the user will not notice whether there is wireless LAN operation or not. Once the virtual operator server 30 detects that there is a possibility to encounter wireless LAN operation based on the subnet relation map 110, the virtual operator server 30 will indicate to the wireless communication device 14 to turn on the wireless LAN interface or may give an indication to the user to turn it on.

A selection of access network for authentication application 146 arranges pre-authentication to unassociated access networks or MASs in advance if the wireless communication device 14 might access particular access networks in the future. This pre-authentication reduces the handoff process time within heterogeneous access networks. The reason why the handoff process time can be reduced is that the wireless communication device 14 does not need to have a new authentication in the next access network because of pre-authenticated in advance. In addition, a selection of access network for association application 148 will create an association with unassociated access networks or some MASs in advance even if actual association is not established, which will also help reduce the handoff process time. The reason why the handoff process time can be reduced is that the virtual operator server 30 already makes pre-association arrangement, which means that the connection is already established with the corresponding node 132 and the access network server. Only the air-interface has not been connected.

Figure 11:
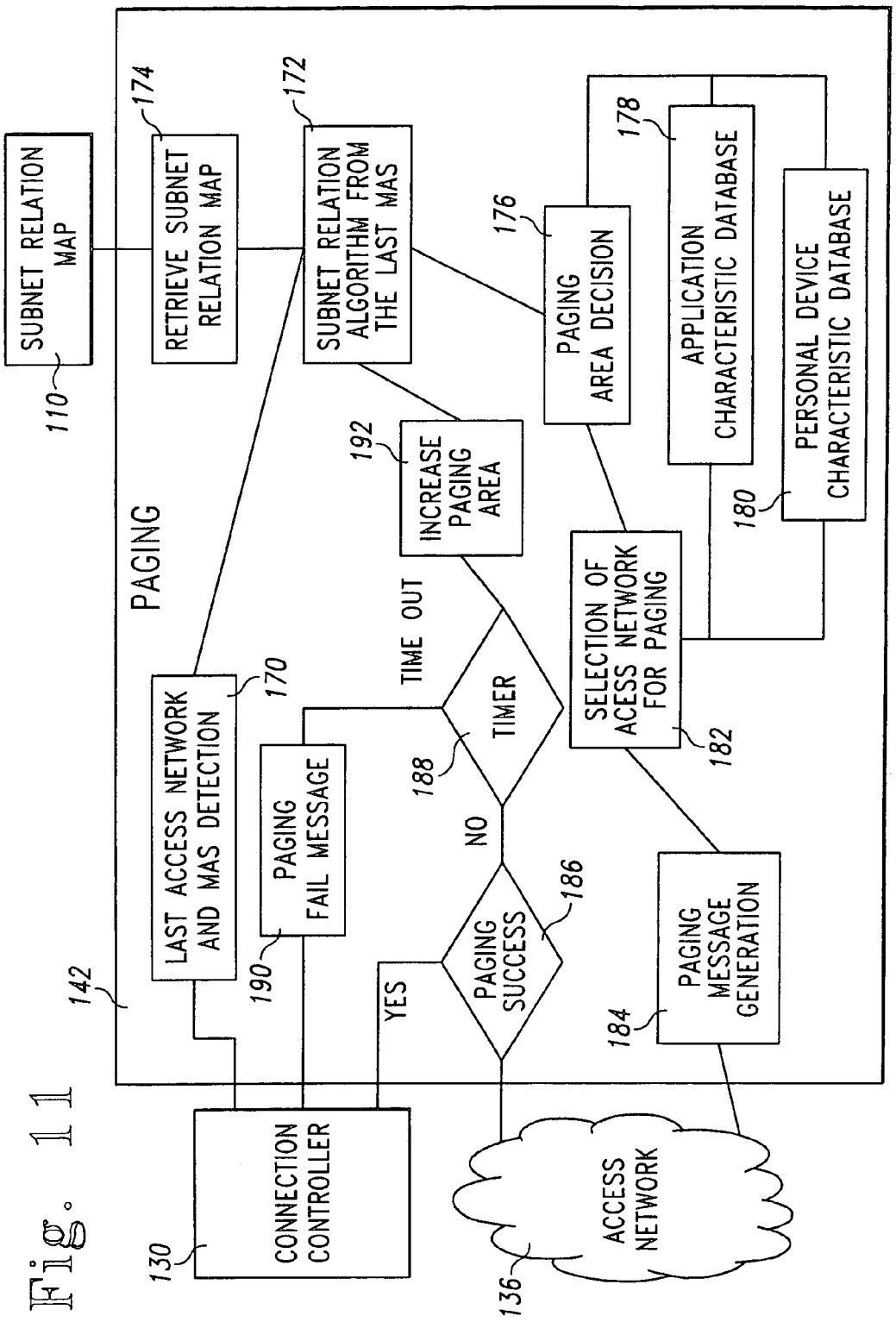
FIG. 11 illustrates the preferred paging area determination component.

Referring now to FIG. 11, details of the paging application 142 are set forth in greater detail below. When the virtual operator server 30 wants to page a respective wireless communication device 14, the paging application 142 will perform the paging process and connect the wireless communication device 14 to the appropriate access network based on the information contained in the subnet relation map 110. When the paging request arrives at the paging application 142, a last access network and MAS detection application 170 will locate the last access network and MAS which the wireless communication device 14 being paged had accessed.

According to the results of the last access network and MAS detection application 170, the paging area is defined by a subnet relation algorithm from the last MAS at step 172. For defining the paging area, a retrieve subnet relation map application 174 fetches the subnet relation map 110. Then, the subnet relation algorithm from the last MAS 172 will create a paging area based on the subnet relation. Many different algorithms can be used to define the paging area.

A paging area decision application 176 preferentially decides the final paging area. The paging area decision application 176 takes into account current application characteristics, which are stored in an application characteristic database 178, and personal device characteristic information, which are stored in a personal device characteristic database 180. For example, multimedia applications require a broadband access network to be connected to the wireless communication device 14. This requirement may not always be capable of being met with a wireless communication system designed for voice communication. Therefore, paging will preferentially use a broadband access network for multimedia applications. As such, based on this information, the paging area decision application 176 will choose the optimal paging area.

A selection of access network for paging application 182 chooses which access network is used for paging. This is because some access networks may not support paging or it may not be necessary to have many different access networks paging. A paging message generation application 184 will generate the actual paging message that is sent to the access networks 136. A paging success routine 186 will identify whether or not the paging is successful for the paged wireless communication device 14. In addition, a timer 188 will handle the maximum length of paging retry. If the timer 188 decides that the paging process is too long, a paging fail application 190 will generate a failure message. If the timer 188 has not expired, an increase paging area application 192 can be used to increase the paging area when there is no response for the paging message from the paged wireless communication device 14.

In the subnet relation algorithm from the last MAS step 172, algorithms optimize the paging area and throughput performance. In addition, a legacy paging algorithm such as those being used in current mobile communication systems may also be used. However, current legacy paging algorithms are used only for particular access networks 136. The algorithm used in the preferred embodiment of the present invention is an extension of paging area determination algorithms currently used because of having the ability to page across heterogeneous access networks. Of course, it is possible to use each paging algorithm independently.

Figure 12:
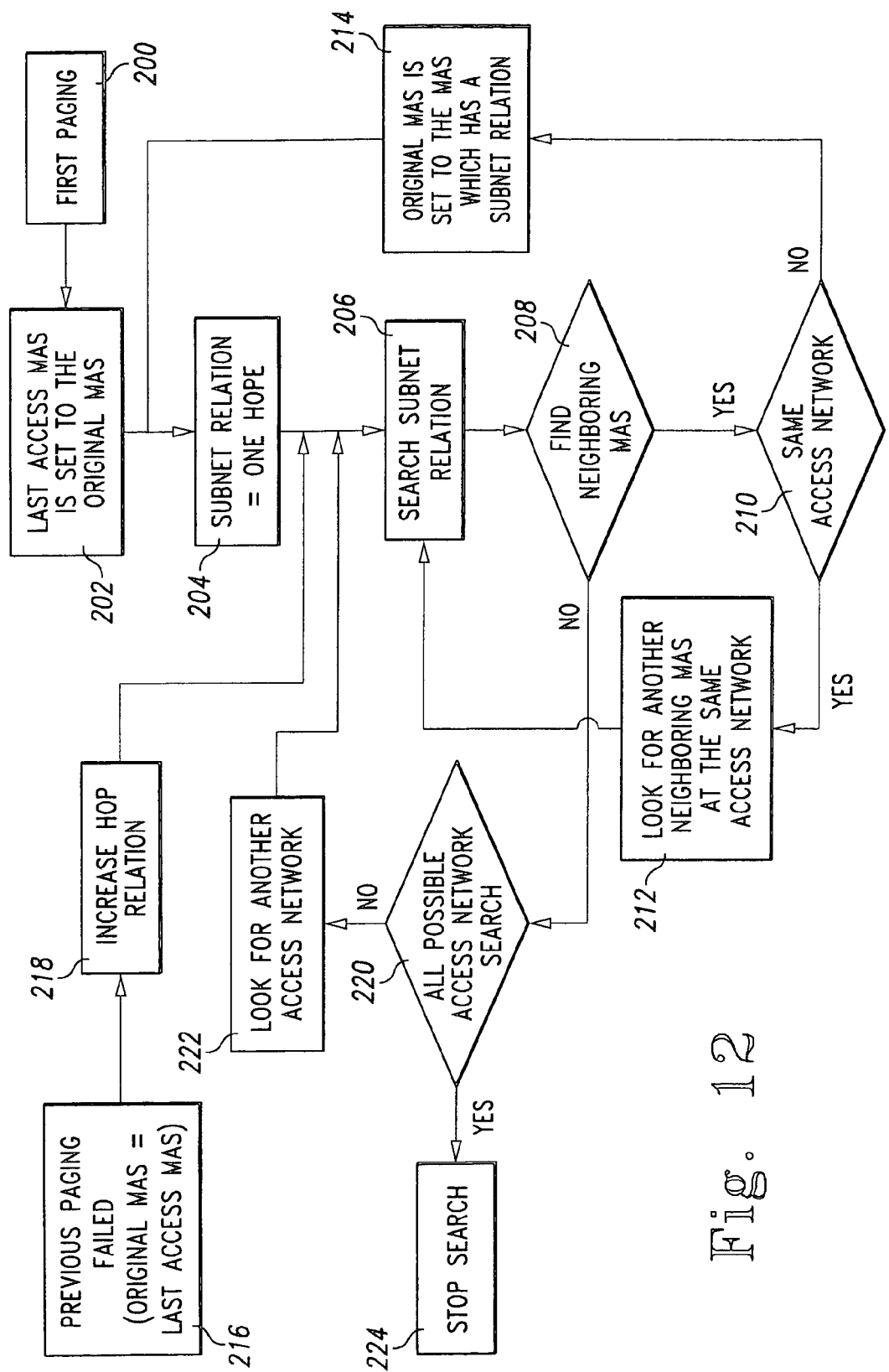
FIG. 12 shows the preferred process steps taken for determining a paging area.

Referring to FIG. 12, the preferred method of determining the paging area for a wireless communication device 14 is described. If the virtual operator server 30 is beginning a paging operation for the first time, the procedure begins at step 200 in FIG. 12. As illustrated, the first step in determining the paging area is to set the last access MAS as the original MAS, which is represented at step 202. In other words, the last MAS that the wireless communication device 14 accessed is set as the original MAS. After the last access MAS is located and set as the original MAS, at step 204 a subnet relation search variable is used to determine the number of hops that will be included in the paging area determination. For example, in the preferred embodiment of the present invention the subnet relation search variable is set to one hop. The last access MAS includes the last associated MAS which the wireless communication device 14 associates with when it moves out of the paging area. For example, if the mobile communication system defines the paging area so that the wireless communication device 14 moves out of the paging area, it must update its location. However, as another example, whenever the wireless communication device 14 moves out from the current defined paging area or wakes up from a sleeping mode, the wireless communication device 14 will update its location and just send the update message to the nearest MAS. Based on the last associated MAS, the virtual operator server 30 will redefine the paging area.

At step 206, the preferred method searches the subnet relation map 110 to locate MASs that are located within one hop of the original MAS, which is the last MAS that was accessed by the wireless communication device 14. If the subnet relation search variable is set to another number of hops, another preferred embodiment could locate MASs that are located a predetermined number of hops from the original MAS. Using subnet relations that are contained in the subnet relation map 110 allows the virtual operator server 30 to locate neighboring MASs that have a subnet relation to the original MAS, which is illustrated as set 206 in FIG. 12. Although not specifically illustrated in FIG. 12, in one preferred embodiment of the present invention paging may then take place using each of the MASs that have been located in the steps enumerated above.

In another preferred embodiment of the present invention, if neighboring MASs are located, or found, the virtual operator server 30 determines if each MAS that was found is located in the same access network at step 210. In the preferred embodiment, if each MAS is located in the same access network, then the virtual operator server 30 looks for another neighboring MAS in the same access network by searching the subnet relation map 110, which is represented at step 212. In other words, the virtual operator server 30 adds MASs that have a subnet relation with each MAS that has been located to the paging area. This allows the paging area to be increased thereby increasing the area in which the wireless communication device 14 could be located by the paging process.

If the neighboring MASs that are located in the subnet relation map 110 are not located in the same access network, another preferred embodiment of the present invention can set status of the MASs that are located in other access networks as the original MAS and look for MASs that have a subnet relation with the MAS that was located in the other access network, which is represented at step 214. After the MASs that are located in this step are found, the preferred embodiment goes back to step 204 to located MASs that are within one hop of each of these MASs. Again, this allows the paging area to be increased thereby increasing the area in which the wireless communication device 14 could be located by the paging process by adding more MASs to the overall paging area.

At step 216, if the previous paging attempt failed, the subnet relation variable can be increased to increase the number of hops that are searched, which is represented at step 218. Once the subnet relation variable is increased, the virtual operator server 30 returns to step 206 to search the subnet relation map 110 to locate MASs that satisfy the increase in the subnet relation. As set forth above, this process increases, the paging area, thereby increasing the area in which the wireless communication device 14 could be located by the paging process by adding more MASs to the paging area.

If no neighboring MASs are located in step 208, the virtual operator server 30 can check to determine if all possible access networks have been searched, which is illustrated at step 220. If all possible access networks have not been searched, the virtual operator server 30 will look for another access network to search using the subnet relation map 110, which is represented at step 222. If all possible access networks have been searched during the paging process, the virtual operator server 30 will stop paging the wireless communication device 14, which is represented at step 224.

Figure 13:
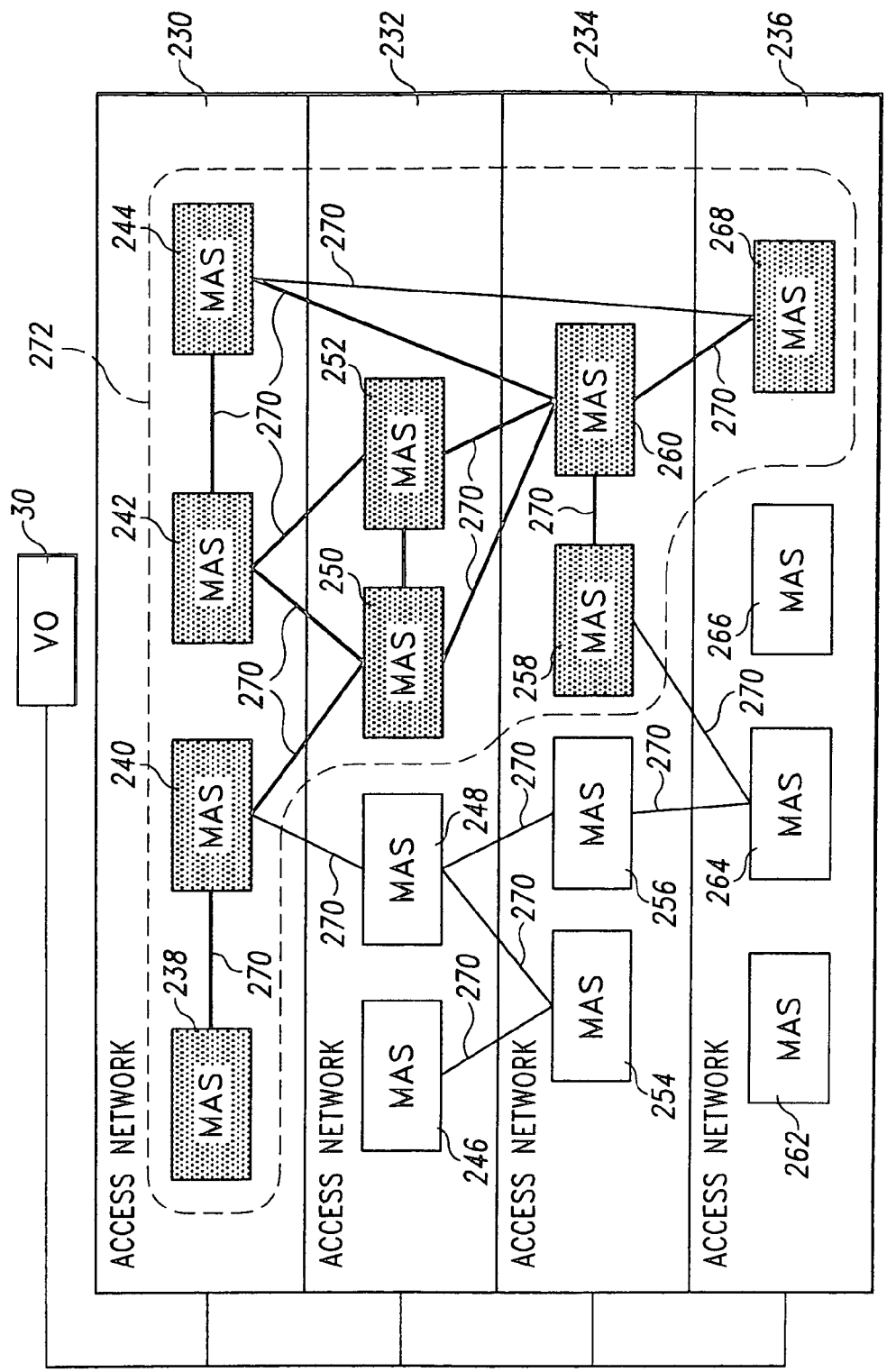
FIG. 13 illustrates a first preferred paging area defined by the present invention.

Referring to FIG. 13, the virtual operator server 30 is illustrated connected to a first, second, third and fourth access network 230-236. Each respective access network 230-236 includes a plurality of MASs 238-268 that have subnet relations 270 with certain MASs 238-268 within each respective access network 230-236. In FIG. 13, MAS 260 has been designated as the original MAS for example only.

Those skilled in the art should recognize that other MASs would be designated as the original MAS during operation of the present invention.

As previously set forth, in one preferred embodiment of the present invention neighboring MASs, even if a particular MAS site belongs to a separate access network 230-236, is included when determining a paging area 272 that is based on original MAS 260. FIG. 13 shows that one hop or subnet relation from original MAS 260 is included in the paging area 272. One hop means that there is a subnet relation between MASs preferentially located within one relation of original MAS 260. As such, MASs 244, 250, 252, 258 and 268 are included in the paging area 272. This paging area could be used in some embodiments of the present invention, however, in the preferred embodiment the paging area is extended.

Figure 14:
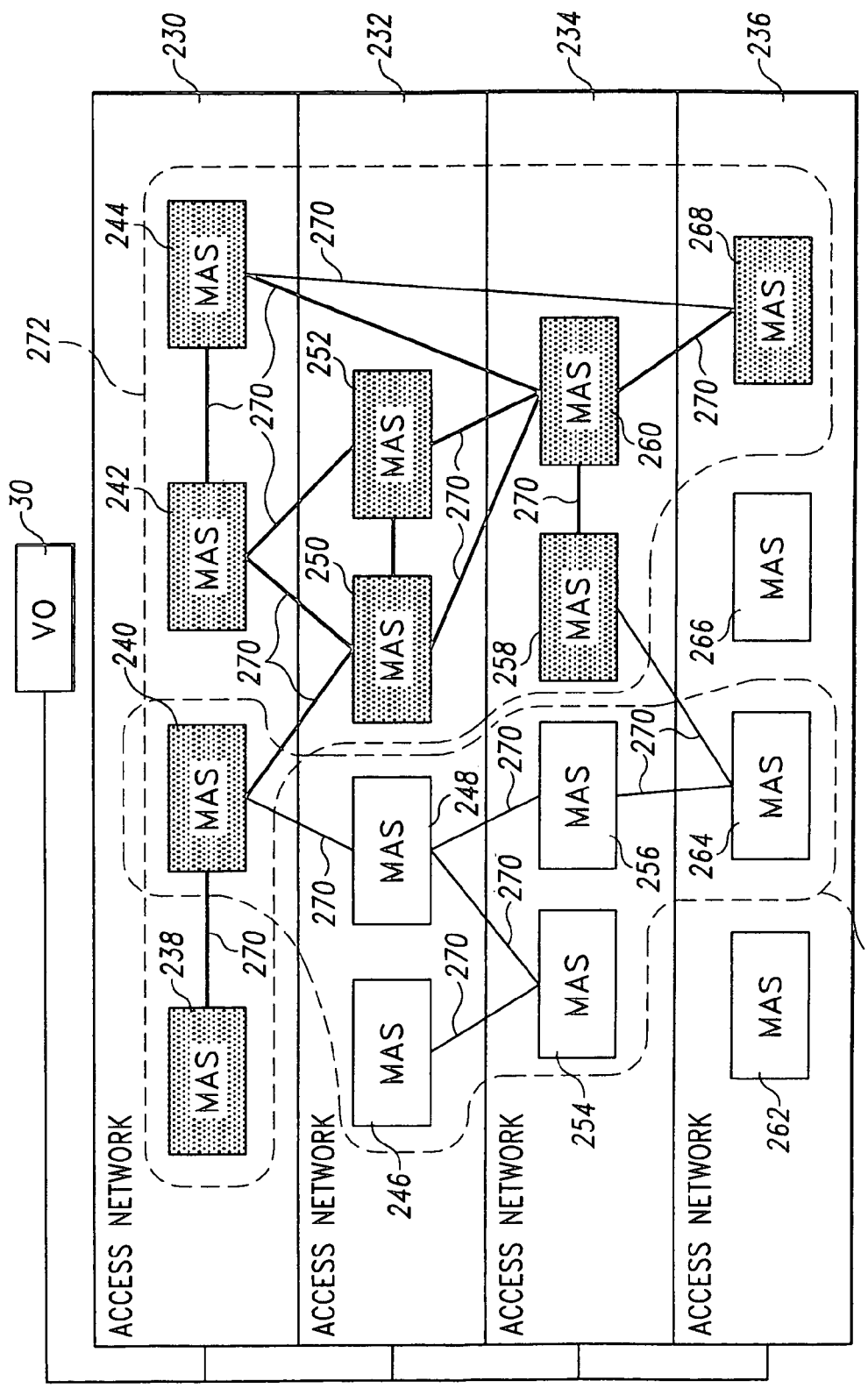
FIG. 14 illustrates a second preferred paging area defined by the present invention.

In the example illustrated in FIG. 13, the paging area 272 has been extended to include all MASs that are within one hop or subnet relation of each MAS chosen by the method set forth in the preceding paragraph, which are not located in the same access network 230-236 as the original MAS 260. As such, this extends the paging area 272 to include MAS 238, 240 and 242. One step relation should be construed as the same level of access network or higher level of access networks. The "level" presents the size of coverage area. If the size of coverage area is large, a "higher level" may be defined. Referring to FIG. 14, all related MASs under the highest access network level are included to define a second paging area 274. As shown, the second paging area 274 is an extension of the first paging area 272. The second paging area 274 includes MAS 240, 248, 254, 256 and 264. The extension of the paging area is based on the increment of one step subnet relation. So, both of the first paging area 272 and the second paging area 274 are considered as the overall paging area.

Figure 15:
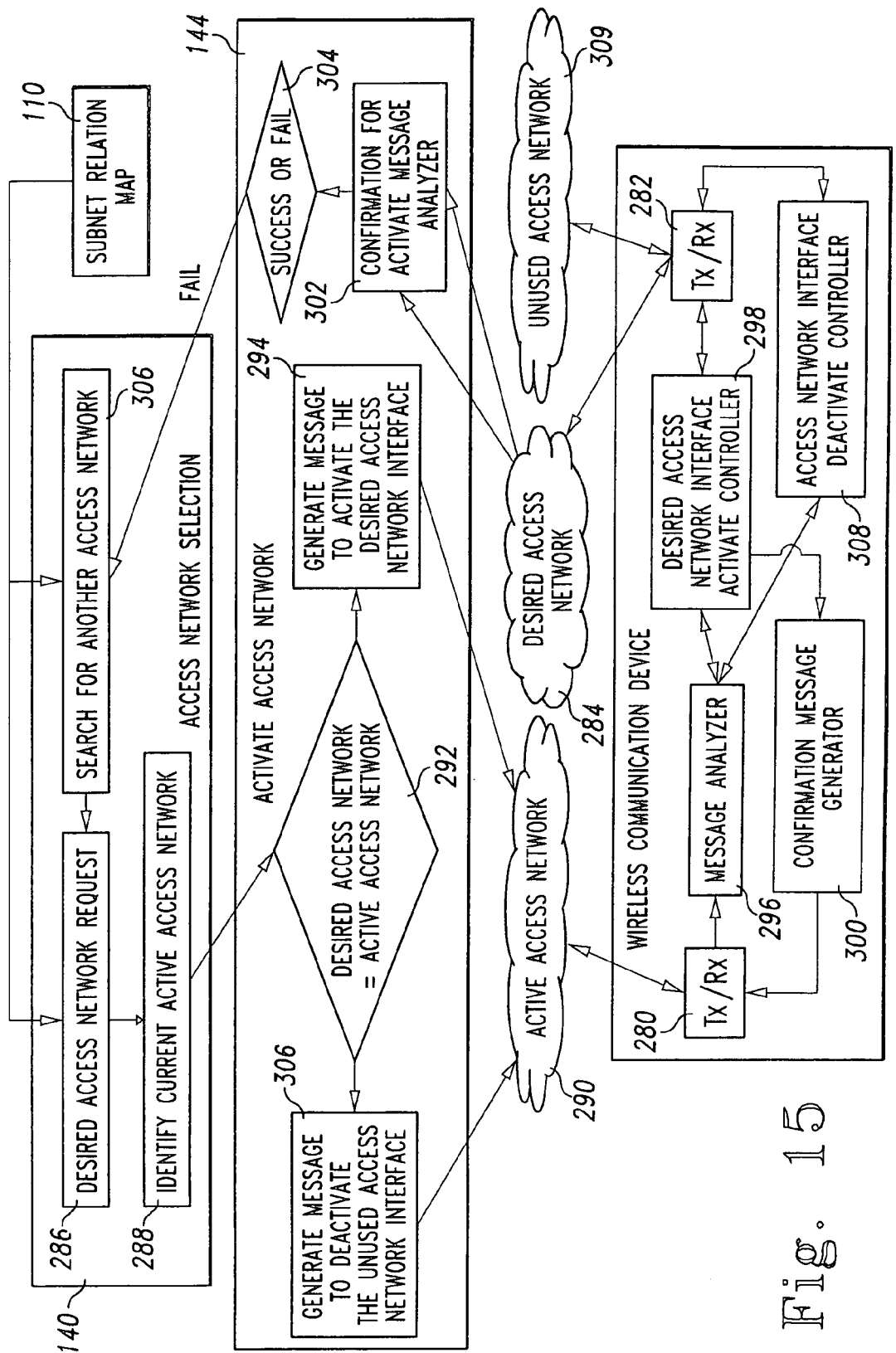
FIG. 15 illustrates a preferred access network interface activation system.

In yet another preferred embodiment of the present invention, subnet relations from the subnet relation map 110 are used to activate a respective one of a plurality of access network interfaces 280, 282 located in respective wireless communication devices 14. Although not illustrated in this figure, access network interfaces 280, 282 can be combined into one single module. Referring to FIG. 15, the activate access network component 144 of the virtual operator server 30 helps activate the current non-active access network interface 282 located in the wireless communication device 14 through a current active access network 280. For example, during operation the access network selection component 140 selects a desired access network 284 for a specific application because of meeting QoS requirements, even if currently the wireless communication device 14 does not activate the desired access network 284. By not having the network interface active all the time, the wireless communication device 14 can save battery drain.

During operation the access network selection application 140 generates a desired access network request 286 that identifies the desired access network 284. In other words, the access network selection application 140 chooses the desired access network 284 as its request. An identify current active access network application 288 is used to identify the current active access network 290 for a respective wireless communication device 14. Once the above-referenced information is gathered, it is provided to the activate access network application 144. The activate access network application 144 then checks to see if the desired access network 284 is the current active access network 290, which is represented at step 292 in FIG. 15. If the desired access network 284 is the same as current active access network 290, then the current active access network 290 remains the active access network.

If the desired access network 284 is different from the current active access network 290, a generate message to activate the desired access network interface routine 294 will generate a message to activate the desired access network interface that is sent through the current active access network 290 to the wireless communication device 14. At the wireless communication device 14, a message analyzer 296 is used to detect the message that indicates the activation of the desired access network interface 282. Once the wireless communication device 14 receives this message, a desired access network interface controller 298 will activate the desired access network interface. As such, the desired access network interface can connect to the desired access network 284.

Whether the desired access network interface 282 is activated or not, a confirmation message generator 300 will send a confirmation message to the activate access network application 144 using the active access network 290. Then, a confirmation for activate message analyzer 302 will identify whether the desired access network interface 282 is activated or not, which is represented at step 304. If the desired access network interface 282 is not working for some reason, a failure message is transmitted to a search for another access network routine 306. The search for another access network routine 306 will look for another possible access network that is suitable for the wireless communication device 14 capability or application. However, without turning on the other access network interface, the present invention can use the subnet relation map 110 to find out all possible access networks, which are available on the current wireless communication device 14 location. It is also possible that the confirmation message can be sent through the desired access network 284 as well as the active access network 290.

In addition, once the desired access network 284 is activated, it is not necessary to have other access network interfaces active. In order to reduce the power consumption, the generate message to deactivate an unused access network interface application 306 will generate the message to deactivate unused access network interface. After the wireless communication device 14 receives the "deactivation message" for a particular unused access network 309 at the message analyzer 296, the access network interface deactivate controller 308 will deactivate access network interface 282.

Figure 16:
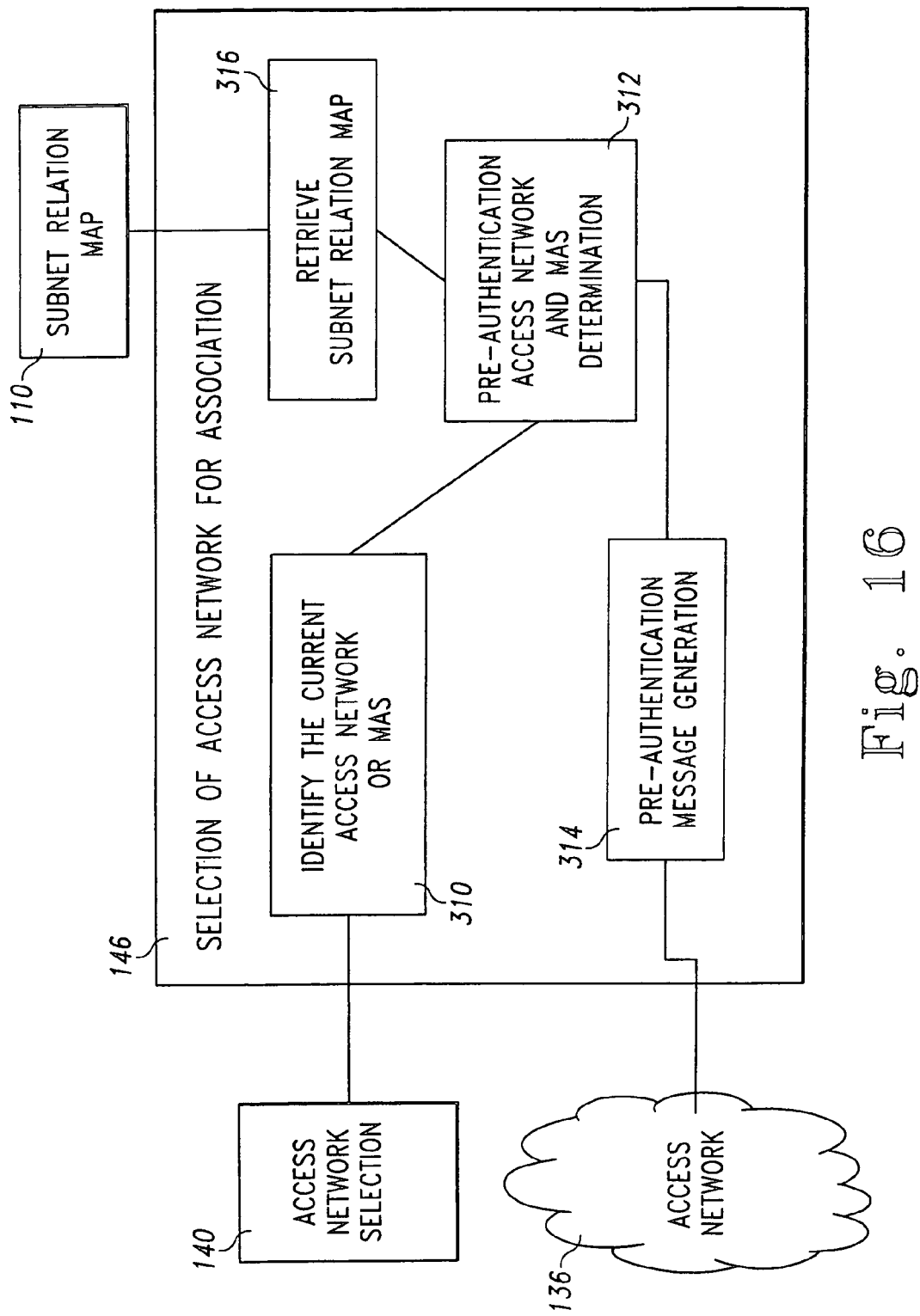
FIG. 16 illustrates a preferred embodiment of the selection of access network for authentication application.

Referring to FIGS. 9 and 16, the selection of access network for authentication component 146 includes an identify current access network or MAS application 310, a pre-authentication to access network or MAS application 312, a pre-authentication message generation application 314, and a retrieve subnet relation map application 316. Before pre-authentication with some access networks 136, it is necessary to know which access network 136 is currently used, then the pre-authentication access networks or MAS have to be determined based on the subnet relation map 110. Since the wireless communication device 14 is accessing to one MAS, it is not necessary to have pre-authentication with the other MAS which is far from the current accessing MAS, for instance. Therefore, access networks and MASs which are supposed to be pre-authenticated are determined carefully. The determination of which access networks and MAS are pre-authorized can be as same as the paging area, or even smaller. For example, the selection of access networks for authentication application 146 can authenticate the wireless communication device 14 to each MAS within one subnet relation of the current active MAS.

As soon as the access network selection application 140 instructs the selection of access network for authentication application 146 to pre-authenticate the wireless communication device 14 at various access networks 136, the identify current access network or MAS application 310 determines the access network or MAS application 310 determines the access network and MAS that the wireless communication device 14 is currently using or accessing. The pre-authentication to access network or MAS application 312 then uses the retrieve subnet relation map application 316 to retrieve the subnet relation map 110, which assist the pre-authentication to access network or MAS application 316 determine what access networks and MASs need pre-authentication. The pre-authentication message generation application 314 is then instructed to generate authentication messages that are sent to predetermined access network 136, which although not illustrated, include at least one MAS.

Figure 17:
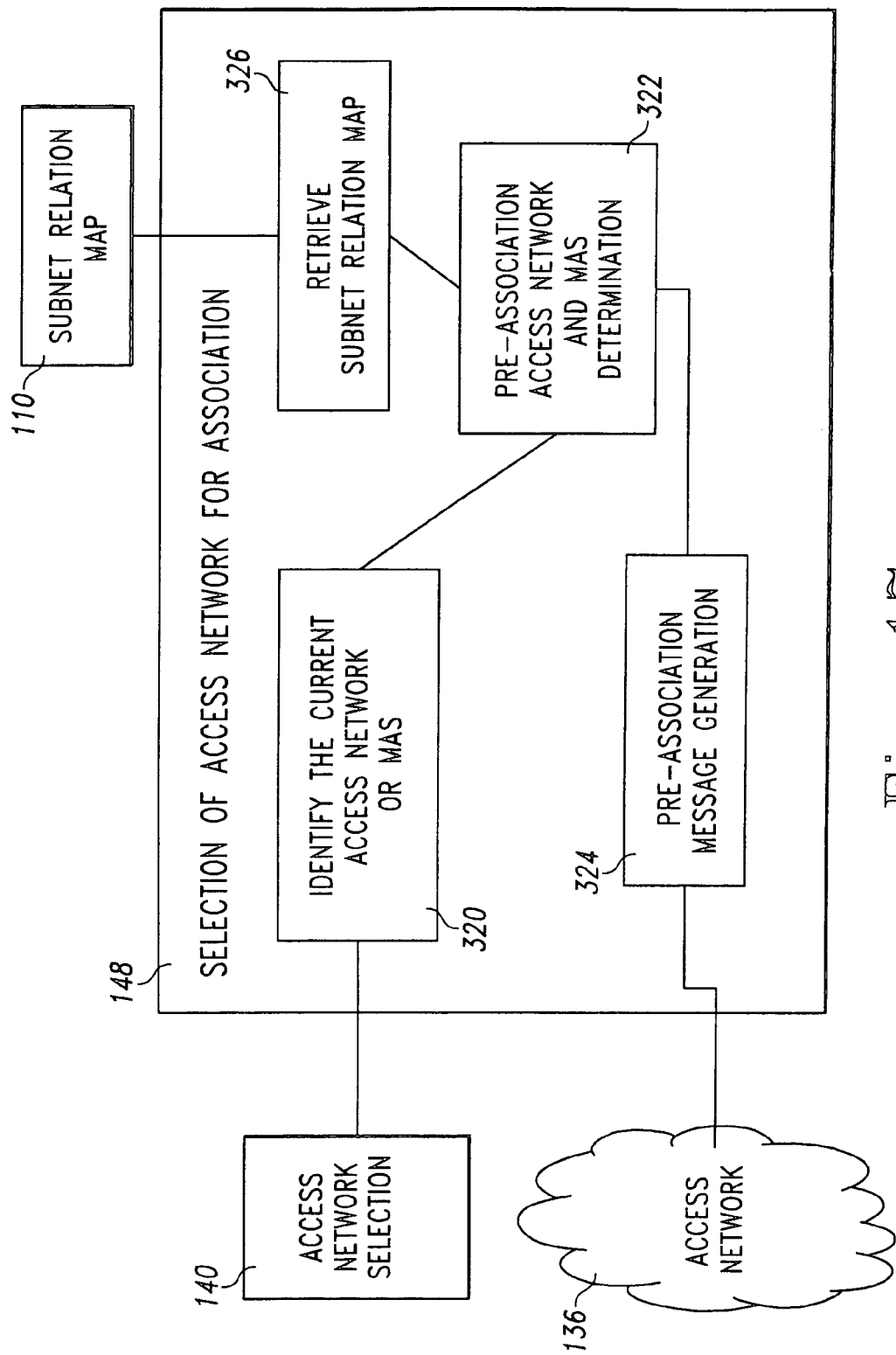
FIG. 17 illustrates a preferred embodiment of the selection of access network for association application.

Referring to FIG. 17, the selection of access network for association component 148 includes an identify current access network or MAS application 320, a pre-association to access network or MAS application 322, a pre-association message generation application 324, and a retrieve subnet relation map application 326. As in the case of pre-authentication, to have pre-association with some access networks or MASs needs to know which access networks and MAS are needed to be associated. Therefore, it is important to determine which access networks and MASs should be associated. As same as above, the paging area can be used as pre-association area.

During a handoff, the current connection will be re-routed to the new access network. To arrange the re-routing after the L2 level handoff, it takes some time. In this preferred embodiment, the association will be pre-arranged between the corresponding node 132 and the target access network (one of access network 136). Another purpose of using the association is that the specific access network recognizes the active state of the wireless communication device 14 even though the specific access network interface is not active. For instance, in order to save the battery power, the wireless communication device 14 can deactivate the mobile phone interface. If this wireless communication device 14 receives a phone call, then the access network should not recognize that the wireless communication device 14 is out of the range. This is because the wireless communication device 14 just turns off the wireless interface for the battery saving. Consequently, the virtual operator server 30, instead of the wireless communication device 14, continues to give the active message to the specific access network even if the wireless communication device 14 turns off the wireless interface.

While the invention has been described in its currently best-known modes of operation and embodiments, other modes, embodiments and advantages of the present invention will be apparent to those skilled in the art and are contemplated herein.

What is claimed is:

1. A method for determining a paging area for a wireless communication device, comprising the steps of:
   maintaining a subnet relation map of subnets having mobility agent servers in a plurality of access networks based on handoff experience;
   determining a last mobility agent server that serviced said wireless communication device;
   retrieving from said subnet relation map a list of mobility agents agent servers within a predetermined number of subnet relations from said last mobility agent server to determine said paging area; and
   generating a paging message that is sent to mobility agent servers on said list of mobility agents servers, further comprising the step of determining an increased paging area if said paging area fails,
   wherein said increased paging area is determined by including one or more subnets within a predetermined level of a selected access network, one or more subnets within the selected access network or subnets of access networks not already included.

2. The method of claim 1, wherein a subnet relation algorithm determines said predetermined number of subnet relations.

3. The method of claim 1, further comprising the step of using an application characteristic database when determining said paging area.

4. The method of claim 1, further comprising the step of using a personal device characteristic database when determining said paging area.

5. The method of claim 1, wherein said increased paging area is determined by adding a predetermined number of subnet relations to said paging area.

6. The method of claim 1, wherein said increased paging area is determined by extending the paging area by one hop of each mobility agent server in the list of mobility agent servers.

7. The method of claim 1, wherein said increased paging area is determined by including the same or higher level access networks.

8. The method of claim 1, further comprising the step of using an application characteristic database to select access networks for the paging area.

9. The method of claim 1, further comprising the step of using a personal device characteristic database to select access networks for the paging area.

10. A paging system for a wireless communication device in a heterogeneous access network, comprising:
    at least one access network;
    at least one mobility agent server associated with each said access network;
    a control server providing control functions to the heterogeneous access network communicating with said mobility agent server, said control server maintaining a subnet relation map of subnets having mobility agent servers in a plurality of access networks based on handoff experience;
    a paging application running on said control server operable to generate a paging message that is sent to mobility agents within a paging area served by said heterogeneous access network;
    and wherein said paging application is operable to determine a last mobility agent server that serviced said wireless communication device, and wherein said paging application retrieves from said subnet relation map a list of mobility agents within a predetermined number of subnet relations from said last mobility agent server to determine said paging area, further comprising the step of determining an increased paging area if said paging area fails,
    wherein said increased paging area is determined by including one or more subnets within a predetermined level of a selected access network, one or more subnets within the selected access network or subnets of access networks not already included.

11. The paging system of claim 10, wherein a subnet relation algorithm is used to determine said predetermined number of subnet relations.

12. The paging system of claim 10, wherein an application characteristic database is used to limit said paging area.

13. The paging system of claim 10, wherein a personal device characteristic database is used to limit said paging area.

14. The paging system of claim 10, wherein said paging area is increased by a predetermined number of subnet relations if said paging message fails.

15. The method of claim 14, wherein said increased paging area is determined by extending the paging area by one hop of each mobility agent server in the list of mobility agent servers.

16. The method of claim 14, wherein said increased paging area is determined by including the same or higher level access networks.

17. The method of claim 10, further comprising the step of using a personal device characteristic database to select access networks for the paging area.

18. A method for determining access network interface activation for a wireless communication device, comprising the steps of:
   providing a plurality of mobility a-gems agent servers in communication with a control server;
   maintaining in said control server a subnet relation map of subnets having mobility agent servers in a plurality of access networks;
   determining a current mobility agent server associated with a service area in which said wireless communication device is currently located;
   retrieving from said subnet relation map a list of mobility agents agent servers within a predetermined number of subnet relations from said current mobility agent server;
   determining an access network interface used for each mobility agent servers-in said list of mobility agent servers; and
   notifying said wireless communication device of said access network interfaces, further comprising the step of generating a confirmation message that is transmitted to said control server once said wireless communication device is notified of said access network interfaces.

19. The method of claim 18, further comprising the step of activating said access network interfaces.

20. A method for providing pre-authentication for a wireless communication device, comprising the steps of:
   maintaining a subnet relation map of subnets having mobility agent servers in a plurality of access networks based on handoff experience;
   determining a current mobility agent server associated with a service area in which said wireless communication device is currently located;
   retrieving from said subnet relation map a list of mobility agent servers within a predetermined number of subnet relations from; and
   generating a pre-authentication message that is transmitted to each mobility agent server in said list of mobility agent servers, further comprising the step of determining an increased paging area if said paging area fails,
   wherein said increased paging area is determined by including one or more subnets within a predetermined level of a selected access network, one or more subnets within the selected access network or subnets of access networks not already included.

21. The method of claim 20, wherein said subnet relations are determined from a subnet relation map.

22. The method of claim 20, further comprising the step of authenticating said wireless communication device in advance of handing off said wireless communication device from said current mobility agent to another mobility agent server.

23. A method of providing pre-association for a wireless communication device, comprising the steps of:
   maintaining a subnet relation map of subnets having mobility agent servers in a plurality of access networks based on handoff experience;
   determining a current mobility agent server associated with a service area in which said wireless communication device is located;
   retrieving from said subnet relation map a list of mobility agent servers within a predetermined number of subnet relations from said current mobility agent server; and
   sending pre-association messages from said wireless communication device to one or more mobility agents in said list of mobility agent servers,
   further comprising the step of determining an increased paging area if said paging area fails,
   wherein said increased paging area is determined by including one or more subnets within a predetermined level of a selected access network, one or more subnets within the selected access network or subnets of access networks not already included.

24. The method of claim 23, further comprising the step of sending a keep alive message to each of said one or more mobility agent servers.

* * * * *